US009546689B2

(12) United States Patent
Yang et al.

(10) Patent No.: US 9,546,689 B2
(45) Date of Patent: Jan. 17, 2017

(54) MACHINE ARRANGEMENT

(71) Applicant: AKTIEBOLAGET SKF, Göteborg (SE)

(72) Inventors: Hongyu Yang, Houten (NL); John F. van de Sanden, Nieuwegein (NL); Hendrik Anne Mol, Sleeuwijk (NL)

(73) Assignee: AKTIEBOLAGET SKF, Gothenburg (SE)

( * ) Notice: Subject to any disclaimer, the term of this patent is extended or adjusted under 35 U.S.C. 154(b) by 66 days.

(21) Appl. No.: 14/406,935

(22) PCT Filed: Jun. 12, 2013

(86) PCT No.: PCT/EP2013/062137
§ 371 (c)(1),
(2) Date: Dec. 10, 2014

(87) PCT Pub. No.: WO2013/186256
PCT Pub. Date: Dec. 19, 2013

(65) Prior Publication Data
US 2015/0219162 A1 Aug. 6, 2015

(30) Foreign Application Priority Data
Jun. 14, 2012 (EP) .................. PCT/EP2012/061347

(51) Int. Cl.
*F16C 32/00* (2006.01)
*F16C 41/00* (2006.01)
*C03C 27/04* (2006.01)
*G01M 11/08* (2006.01)
*G01M 13/04* (2006.01)
*G01L 1/24* (2006.01)
(Continued)

(52) U.S. Cl.
CPC ................. *F16C 41/00* (2013.01); *B32B 7/04* (2013.01); *B32B 17/06* (2013.01); *C03C 27/046* (2013.01); *F16C 33/58* (2013.01); *F16C 33/586* (2013.01); *G01L 1/246* (2013.01); *G01M 11/086* (2013.01); *G01M 13/04* (2013.01); *B32B 2250/02* (2013.01); *B32B 2262/101* (2013.01); *Y10T 403/479* (2015.01)

(58) Field of Classification Search
CPC ......... F16C 33/58; F16C 33/586; F16C 41/00; F16C 2226/34; F16C 2233/00
USPC ........................................................ 384/448
See application file for complete search history.

(56) References Cited

U.S. PATENT DOCUMENTS 5,594,819 A 1/1997 Narendran et al.
8,790,013 B2 * 7/2014 Reedman ........... G01D 5/35303
384/448
(Continued)

FOREIGN PATENT DOCUMENTS

WO 2010043699 A1 4/2010

*Primary Examiner* — James Pilkington
(74) *Attorney, Agent, or Firm* — Bryan Peckjian; SKF USA Inc. Patent Dept.

(57) ABSTRACT

A machine arrangement, including at least one bearing ring, wherein a glass fiber is connected with the machine arrangement. To allow a proper measurement of stresses even at curved surfaces of the machine arrangement as it is typical in the case of bearing rings, the connection between the glass fiber and the machine arrangement is established by a metallic material which metal material is connected by material bonding with the machine arrangement as well as with the glass fiber.

12 Claims, 5 Drawing Sheets

(51) Int. Cl.
  *B32B 7/04* (2006.01)
  *B32B 17/06* (2006.01)
  *F16C 33/58* (2006.01)

(56) References Cited

U.S. PATENT DOCUMENTS

| | | | |
|---|---|---|---|
| 9,217,681 B2* | 12/2015 | Alemohammad | C03C 25/106 |
| 2014/0311250 A1* | 10/2014 | Maul | G01B 11/18 |
| | | | 73/800 |
| 2015/0292966 A1* | 10/2015 | Yang | C03C 27/044 |
| | | | 384/448 |

* cited by examiner

MACHINE ARRANGEMENT

CROSS REFERENCE TO RELATED APPLICATIONS

This is a National Stage Application claiming the benefit of International Application Number PCT/EP2013/062137 filed on 12 Jun. 2013, which claims the benefit of European Patent Application Serial Number PCT/EP2012/061347 filed on 14 Jun. 2012, both of which are incorporated herein by reference in their entireties.

TECHNICAL FIELD

The invention relates to a machine arrangement, comprising or being at least one bearing ring, wherein a glass fiber is connected with the machine arrangement.

BACKGROUND

It is known in the art to equip a machine part of this kind with a glass fiber element to allow the measurement of different physical parameters. By doing so, a survey of the parameters becomes possible by using the fiber Bragg grating (FBG) method. By this method temperatures as well as strains of the machine arrangement can be monitored.

For doing so it is necessary to connect a glass fiber with the component. For surveying temperatures it is essential that a thermal coupling between the glass fiber and the machine arrangement is established. For monitoring strains it is necessary to mechanically connect the glass fiber with the component to be monitored.

Specifically in the latter case problems arise because the glass fiber is normally equipped with a plurality of coaxially arranged cover layers. A typical construction employs a cladding arranged around the glass fiber (core) itself; the cladding is coated by a coating layer. Then, strengthening fibers (made e. g. from aramid) are arranged at the outer circumference of the coating. Finally the strengthening fibers are cased by a hollow cylindrical cable jacket.

When a glass fiber element of this type is connected with the component a certain elasticity is inherent between the glass core and the component. Thus, specifically the measurement of strains is problematic due to the elasticity. This is specifically a problem when the component is not even or flat but if it has a spherical shape. This is typical in the case of a part of a bearing, specifically of a roller bearing.

It is an object of the present invention to propose a machine arrangement of the above mentioned kind which is designed in such a manner that a contact is established between the glass fiber core and the component which is as stiff as possible. By doing so it is aimed to monitor physical properties, especially of strains in the component, with a high degree of precision. Thus, specifically a proper measurement of stresses should become possible even at curved surfaces of the machine arrangement as is typical in the case of bearing rings.

SUMMARY OF THE INVENTION

A solution according to the invention is characterized in that the connection between the glass fiber and the machine arrangement is established by a metallic material which metal material is connected by material bonding with the machine arrangement as well as with the glass fiber.

The glass fiber is basically free from any layer as described above. An exception can be that the glass fiber is encased by a reflective cover material to ensure the conduction of light through the glass fiber.

The metallic material preferably consists of at least two different metallic materials, wherein a first metallic material encases the glass fiber and wherein a second metallic material connects the first metallic material with the machine arrangement by material bonding.

The material bonded connection between the metallic material and the machine arrangement can be established by a welding process using the metallic material.

The material bonded connection between the metallic material and the glass fiber can also be established by a welding or melting process using the metallic material.

The mentioned first metallic material can be a single metal element. In this case a preferred embodiment proposes that the first metallic material is chromium (Cr). An alternative suggests nickel (Ni) as the first metallic material.

The second metallic material can be a metal alloy. In this case the second metallic material can be an alloy of chromium (Cr) and nickel (Ni).

In a preferred embodiment of the invention, a cladding of nickel (Ni) which encases the glass fiber is provided; this cladded glass fiber it then coated with a nickel-chromium-alloy.

The second metallic material can have at least partially a thickness measured in the direction perpendicular to the longitudinal axis of the glass fiber of at least 0.3 mm, preferably of at least 0.5 mm.

The glass fiber can be arranged on a curved surface of the machine arrangement, especially on a cylindrical surface of a bearing ring.

Thereby, the glass fiber can be attached to a cylindrical surface of the machine arrangement. Also, it is possible to locate the glass fiber in a groove which is machined for the glass fiber into the machine arrangement.

By the proposed design a stiff and direct connection is established between the glass fiber and the component to be monitored so that physical parameters—especially temperatures and strains—can be detected in a precise way.

BRIEF DESCRIPTION OF THE DRAWINGS

The drawings show embodiments of the invention.

DETAILED DESCRIPTION OF THE INVENTION

Figure 1:
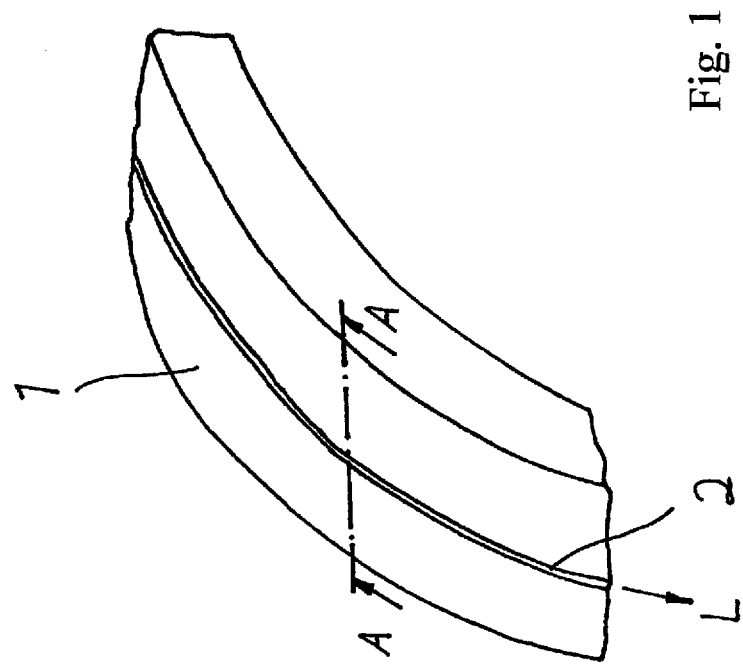
FIG. 1 shows in a perspective view a section of an outer bearing ring of a roller bearing, on which a glass fiber is fixed.

In FIG. 1 a machine arrangement 1 being an outer bearing ring of a roller bearing is shown. The bearing ring 1 has an outer spherical surface which is to be monitored with respect to strains which act in the machine part. The survey of those strains is carried out by the fiber Bragg grating (FBG) method which is known as such. Reference is made e. g. to U.S. Pat. No. 6,923,048 B2 where this technology is explained in more detail.

For doing so a glass fiber 2 is securely fixed on the spherical, i. e. cylindrical outer circumference of the bearing ring 1. The glass fiber 2 has a longitudinal direction L which extends in the circumferential direction of the bearing ring 1.

Details concerning the fixation of the glass fiber 2 at the bearing ring 1 can be seen from FIG. 2.

Figure 2B:
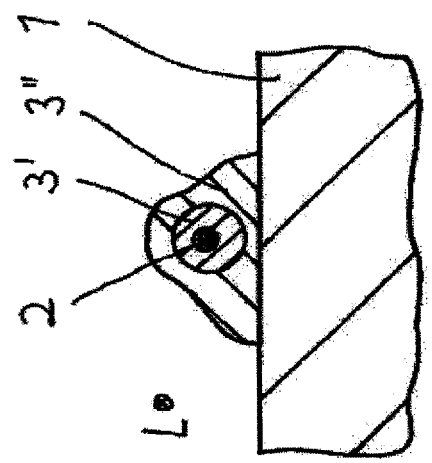
FIG. 2b shows the cross section A-A according to FIG. 1.
Figure 2A:
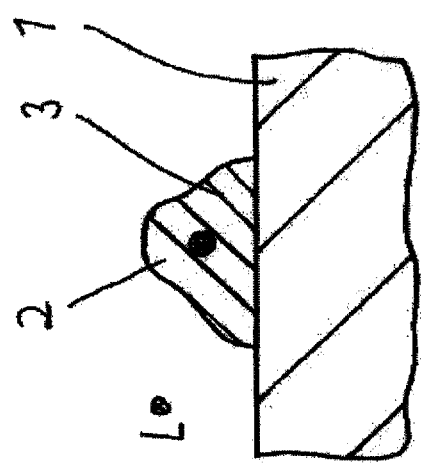
FIG. 2a shows a glass fiber connected to a bearing ring by a metallic material.

In FIG. 2a, it can be seen that the glass fiber 2 is basically the pure glass element-possibly covered only by a reflective coating to ensure proper light conduction within the glass fiber-which is then connected with the bearing ring 2 by means of metallic material 3.

In FIG. 2b, two different metallic materials are employed: A first metallic material 3' coats the glass fiber 2 itself. The preferred material is chromium (Cr).

The first metallic material 3' it then connected with a second metallic material 3". This material is preferably an alloy, preferably from chromium (Cr) and nickel (Ni).

Thus, a material bonding is established between the glass fiber 2 and the machine part 1 to be monitored. This means, all strains in the machine part 1 are directly transferred into the glass fiber 2. Thus, the precondition is assured for a precise measurement of physical parameters of the machine part 1.

Figure 3:
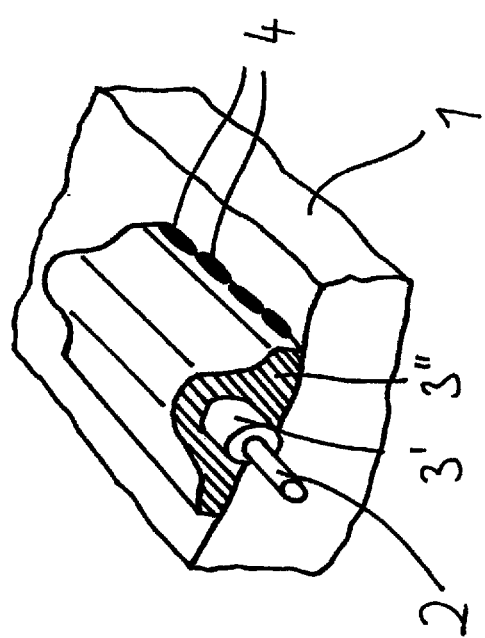
FIG. 3 shows a perspective view of a glass fiber which is fixed at a bearing ring similar to FIG. 2b.

In FIG. 3 a further embodiment of the invention is shown. Here, the glass fiber 2 is provided with a cladding 3' from a first metallic material being nickel (Ni). This cladding is embedded in a second metallic material 3" being a nickel-chromium-alloy. The second metallic material 3" is fixed on the bearing ring 1 by means of welding or brazing 4.

Figure 4:
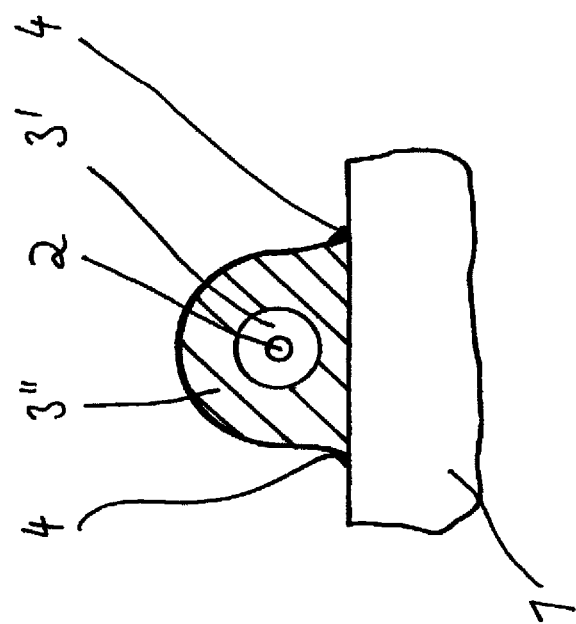
FIG. 4 shows a front view of a glass fiber which is fixed at a bearing ring, similar to FIG. 3.

In FIG. 4 a similar solution is shown. Here, the glass fiber 2 is again embedded in a cladding of nickel 3'. This cladding is covered by a coating 3" of a nickel-chromium-alloy. This coating 3" is fixed with the bearing ring 1 by means of welding or brazing 4.

Figure 5:
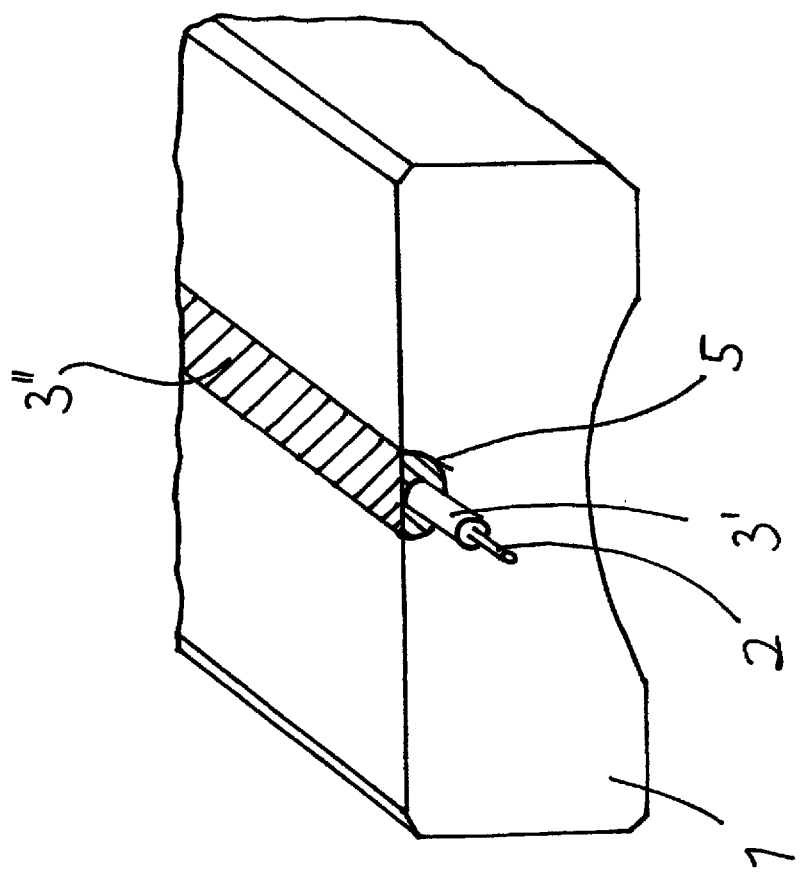
FIG. 5 shows a perspective view of a glass fiber which is fixed in a groove of a bearing ring.

In FIG. 5 an alternative is shown. Here the bearing ring 1 has a groove 5, in which the glass fiber 1 is inserted and securely fixed. For doing so, the glass fiber 1 is cladded with a cover 3' from nickel. Then, the covered glass fiber 2 is fixed on the bearing ring 1 by a nickel-chromium-alloy 3" which fills up the groove 5.

Figure 6:
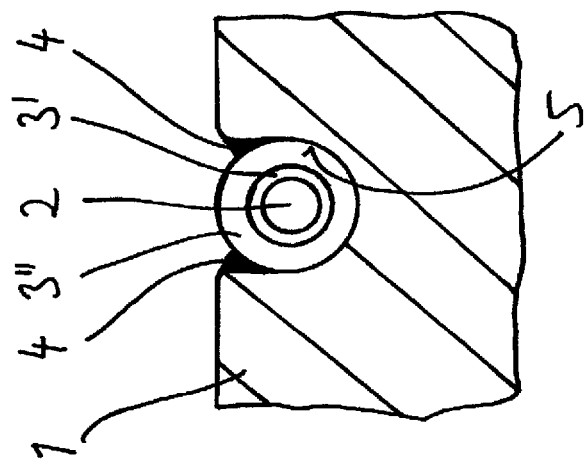
FIG. 6 shows a front view of a glass fiber which is fixed in a groove of a bearing ring, similar to FIG. 5.

A similar solution is shown in FIG. 6. Here, the bearing ring 1 again has a groove 5 in which the glass fiber 2 is inserted. The glass fiber 2 is embedded in a nickel cladding 3'. The cladding 3' is embedded by a nickel-chromium-alloy 3". The fixation of the coating of nickel-chromium-alloy 3" is fixed in the groove 5 by means of welding or brazing 4.

Figure 7A:
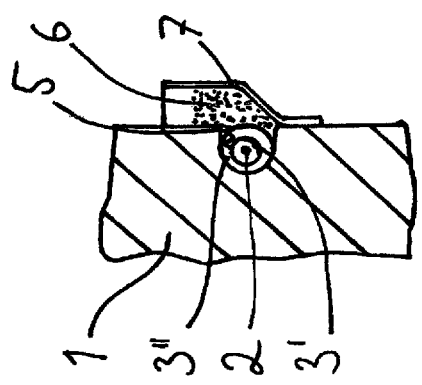
FIG. 7a shows the process of fixing a glass fiber in a groove of a bearing ring in a first, early state.
Figure 7B:
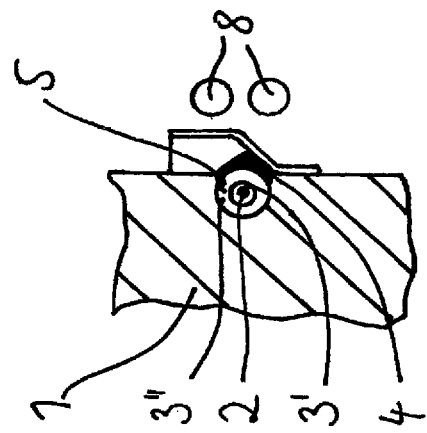
FIG. 7b shows the process of fixing a glass fiber in a groove of a bearing ring in a second, later state.

In FIG. 7a and FIG. 7b a process is depicted by which a fixation as shown in FIG. 6 can be realized. Here, a container 7 is arranged at the bearing ring 1 when the embedded glass fiber 2 (coated again by a nickel layer 3' and a layer form a nickel-chromium-alloy 3") is arranged in a groove 5 in the bearing ring 1. The container 7 is filled with braze paste 6. This is shown in FIG. 7a.

Heating elements 8 being inductive heaters are arranged near the container 7. Due to the heat produced by the inductive heaters 8 the braze paste 6 melts and forms the brazing 4 which is shown in FIG. 7b. Afterwards, the container 7 is removed.

The proposed connection technology can be used to fix a glass fiber 2 firmly between two points on the bearing ring 1 to use the fiber Bragg grating (FBG) method for measurement of specific data.

For the cladding of the glass fiber 2 itself, pure material—specifically nickel (Ni) or chromium (Cr)—is preferred. This gives a very dense and defect free coating.

For the outer coating a selection can be made from suitable alloys between nickel (Ni) and chromium (Cr) with or without additional elements such as B, Fe, Mn, Si, Ti, which can be selected to obtain a harder or more ductile coating and/or to reduce the melting temperature for the coating or later brazing or welding to be applied.

Beside pure nickel also nickel can be used which is alloyed with a maximum of 2 weight-% titan (Ti), 1 weight-% silizium (Si) or a nickel-alloy with a maximum of 3.5 weight-% boron (B), 4.5 weight-% silizium (Si), between 5 and 7 weight-% chromium (Cr) and about 4 weight-% ferrum (Fe).

For the outer coating 3" pure chromium (Cr) can be employed but also chromium alloyed with a maximum of 20 to 60 weight-% nickel (Ni). The outer coating has preferably between 0.2 to 0.5 mm wall thickness in order to enable microlaser welding or brazing, Here, a nickel-chromium-alloy is preferred with 20 to 80 weight-% nickel (Ni) and a balance of chromium (Cr). Also, an alloy has been found suitable with 20 to 70 weight-% nickel (Ni), 1 to 5 weight-% mangan (Mn), a maximum of 1 weight-% silizium (Si) and a balance of chromium (Cr). Also the addition of copper (Cu) can be beneficial.

REFERENCE NUMERALS

1 Machine arrangement (bearing ring)
2 Glass fiber
3 Metallic material
3' First metallic material
3" Second metallic material
4 Welding/Brazing
5 Groove
6 Braze paste
7 Container
8 Heating element (induction heating element)
L Longitudinal axis

The invention claimed is:
1. A machine arrangement, comprising at least one bearing ring;
 a glass fiber connected with the machine arrangement,
 wherein the connection between the glass fiber and the machine arrangement is established by a metallic material, wherein the metallic material is connected to each of the machine arrangement and the glass fiber by a material bonding, the metallic material encasing the glass fiber such that when viewing a cross section of the glass fiber the metallic material contacts and completely surrounds an outer surface of the glass fiber, the metallic material is materially bonded entirely around the outer surface of the glass fiber such that when viewing the cross section the metallic material is materially bonded to every circumferential location of the outer surface of the glass fiber, and wherein the metallic material is made of a single material composition such that the single material composition both encases the glass fiber and is the only material composition located between the glass fiber and a surface of the machine arrangement.

2. The machine arrangement according to claim 1, wherein the material bonded connection between the metallic material and the machine arrangement is established by a welding process using the metallic material.

3. The machine arrangement according to claim 1, wherein the material bonded connection between the metallic material and the glass fiber is established by one of a welding process or a melting process using the metallic material.

4. The machine arrangement according to claim 1, wherein the metallic material is chromium (Cr).

5. The machine arrangement according to claim 1, wherein the metallic material is nickel (Ni).

6. The machine arrangement according to claim 1, wherein the metallic material is a metal alloy.

7. The machine arrangement according to claim 6, wherein the metallic material is an alloy of chromium (Cr) and nickel (Ni).

8. The machine arrangement according to claim 1, wherein the metallic material has a thickness measured in a direction perpendicular to a longitudinal axis of the glass fiber of at least 0.3 (zero point three) mm.

9. The machine arrangement according to claim 1, wherein the glass fiber is arranged on a curved surface of the machine arrangement.

10. The machine arrangement according to claim 9, wherein the curved surface of the machine arrangement is a cylindrical surface of the at least one bearing ring, and the single composition is the only material composition located between the glass fiber and the cylindrical surface.

11. The machine arrangement according to claim 1 wherein the metallic material has a thickness measured in a direction perpendicular to a longitudinal axis of the glass fiber of at least 0.5 mm.

12. A machine arrangement, comprising at least one bearing ring;
a glass fiber connected with the machine arrangement, the glass fiber being encased with a first metallic material such that when viewing a cross section of the glass fiber the first metallic material contacts and completely surrounds an outer surface of the glass fiber, the first metallic material is materially bonded entirely around the outer surface of the glass fiber such that when viewing the cross section the metallic material is materially bonded to every circumferential location of the outer surface of the glass fiber,
wherein the connection between the glass fiber and the machine arrangement is established by a second metallic material wherein the second metallic material is connected to each of the machine arrangement and the first metallic material by a material bonding, the second metallic material encasing the first metallic material such that when viewing the cross section the second metallic material contacts and completely surrounds a first metallic material outer surface, the second metallic material is materially bonded entirely around the first metallic material outer surface such that when viewing the cross section the second metallic material is materially bonded to every circumferential location of the first metallic material outer surface, and wherein there is no non-metallic material between the glass fiber and the at least one bearing ring.

* * * * *